US012656780B2

(12) United States Patent
Jeong

(10) Patent No.: US 12,656,780 B2
(45) Date of Patent: Jun. 16, 2026

(54) LOGISTICS ROBOT FLEET MANAGEMENT APPARATUS AND FLEET MANAGEMENT METHOD THEREFOR

(71) Applicant: HYUNDAI MOBIS CO., LTD., Seoul (KR)

(72) Inventor: Min Cheol Jeong, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 250 days.

(21) Appl. No.: 18/447,606

(22) Filed: Aug. 10, 2023

(65) Prior Publication Data

US 2024/0134382 A1 Apr. 25, 2024
US 2024/0231365 A9 Jul. 11, 2024

(30) Foreign Application Priority Data

Oct. 21, 2022 (KR) ........................ 10-2022-0136340

(51) Int. Cl.
G05B 19/418 (2006.01)
G05D 1/00 (2006.01)
G05D 1/223 (2024.01)

(52) U.S. Cl.
CPC ........... G05D 1/0297 (2013.01); G05D 1/223 (2024.01)

(58) Field of Classification Search
CPC .. G05D 1/0297; G05D 1/0291; G05D 1/6987; G05D 1/661; G05D 2107/70; G05D 1/223; G05D 1/246; G05D 2105/28; G05D 2109/10; G05D 1/24; G05D 1/644; G05D 1/648; G06Q 10/08; G06Q 10/0631; G06Q 10/08355; B25J 9/1679; Y02P 90/02
See application file for complete search history.

(56) References Cited

U.S. PATENT DOCUMENTS

| | | | | |
|---|---|---|---|---|
| 11,449,074 B2 * | 9/2022 | Lee | ..................... | G06F 18/2148 |
| 2014/0288696 A1 * | 9/2014 | Lert | ......................... | B65G 1/065 |
| | | | | 700/216 |
| 2018/0364719 A1 * | 12/2018 | Wang | ...................... | G06F 16/22 |
| 2019/0310655 A1 * | 10/2019 | Voorhies | .............. | G05D 1/0287 |
| 2020/0246971 A1 * | 8/2020 | Johnson | .................. | B25J 9/1666 |
| 2020/0376973 A1 * | 12/2020 | Traverso | ................. | B60L 53/57 |
| 2022/0002084 A1 * | 1/2022 | Chen | .................... | G05D 1/0217 |
| 2022/0048186 A1 * | 2/2022 | Sharma | ............... | G06F 11/3006 |
| 2022/0234872 A1 * | 7/2022 | Sharma | ................. | G01C 21/206 |
| 2022/0362928 A1 * | 11/2022 | Sharma | .................... | B25J 9/161 |
| 2023/0333562 A1 * | 10/2023 | Al | ......................... | G05D 1/0289 |
| 2023/0401217 A1 * | 12/2023 | Arnold | .............. | G06F 16/24566 |

* cited by examiner

*Primary Examiner* — Masud Ahmed
(74) *Attorney, Agent, or Firm* — NSIP Law

(57) ABSTRACT

A processor-implemented method includes classifying a plurality of aisles into a single-sided docking aisle and a double-sided docking aisle within a structure including a plurality of workstations are arranged in the aisle, determining positions of each of a plurality of logistics robots within each section of each aisle based on received respective positions of respective logistics robots and received respective states of the respective logistics robots, counting a first number of moving logistics robots in each section of each aisle and a second number of waiting logistics robots in each section of each aisle, performing a first traffic control with respect to logistics robots that have entered the traffic section, performing a second traffic control with respect to logistics robots that have requested a docking-out, and generating and assigning a mission corresponding to a result of the first traffic control and the second traffic control.

18 Claims, 16 Drawing Sheets

<u>100</u>

_100_

AISLE CLASSIFICATION UNIT ⟋110

SECTION GENERATION UNIT ⟋120

COMMUNICATION UNIT ⟋130

ROBOT COUNTING UNIT ⟋140

TRAFFIC CONTROL UNIT ⟋150

MISSION GENERATION UNIT ⟋160

MISSION ASSIGNMENT UNIT ⟋170

| WORKSTATION | AISLE | CLASSIFICATION OF AISLES |
|---|---|---|
| 1-A | FIRST AISLE | SINGLE-SIDED DOCKING AISLE |
| 2-A | SECOND AISLE | |
| 1-B | THIRD AISLE | DOUBLE-SIDED DOCKING AISLE |
| 3-A | | |
| 2-B | FOURTH AISLE | |
| 4-A | | |
| 3-B | FIFTH AISLE | DOUBLE-SIDED DOCKING AISLE |
| 5-A | | |
| 4-B | SIXTH AISLE | |
| 6-A | | |
| 5-B | SEVENTH AISLE | DOUBLE-SIDED DOCKING AISLE |
| 7-A | | |
| 6-B | EIGHTH AISLE | |
| 8-A | | |
| 7-B | NINTH AISLE | SINGLE-SIDED DOCKING AISLE |
| 8-B | TENTH AISLE | |

PERFORM FIRST TRAFFIC CONTROL WITH RESPECT TO LOGISTICS ROBOTS THAT HAVE ENTERED FIRST TRAFFIC SECTION (SECOND SECTION) ~_S810_

PERFORM FIRST TRAFFIC CONTROL WITH RESPECT TO LOGISTICS ROBOTS THAT HAVE ENTERED SECOND TRAFFIC SECTION (THIRD SECTION) ~_S820_

PERFORM SECOND TRAFFIC CONTROL WITH RESPECT TO LOGISTICS ROBOTS THAT HAVE REQUESTED DOCKING-OUT ~_S830_

S460

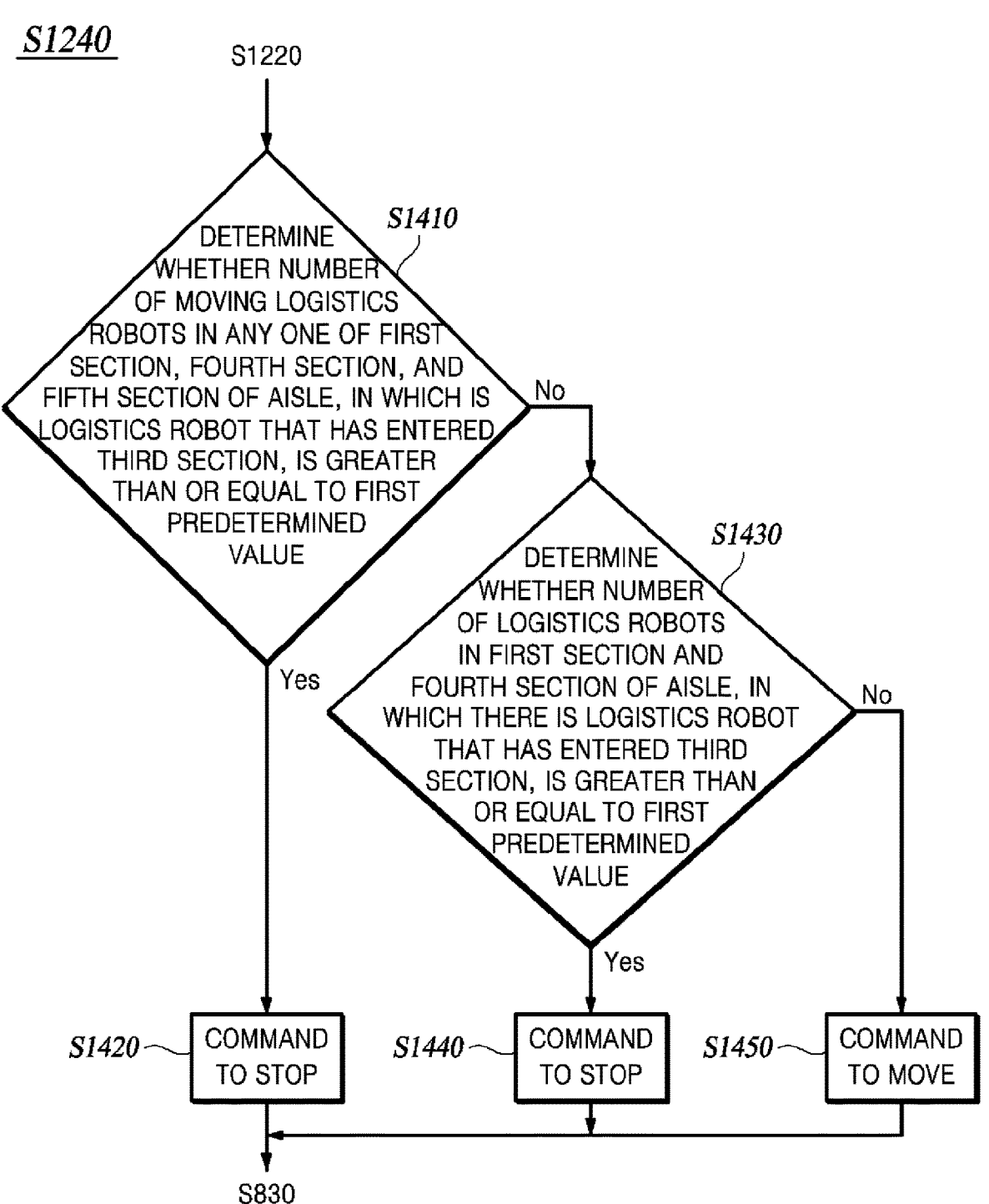

*S1240*

S1220

*S1410*

DETERMINE WHETHER NUMBER OF MOVING LOGISTICS ROBOTS IN ANY ONE OF FIRST SECTION, FOURTH SECTION, AND FIFTH SECTION OF AISLE, IN WHICH IS LOGISTICS ROBOT THAT HAS ENTERED THIRD SECTION, IS GREATER THAN OR EQUAL TO FIRST PREDETERMINED VALUE

No

Yes

*S1430*

DETERMINE WHETHER NUMBER OF LOGISTICS ROBOTS IN FIRST SECTION AND FOURTH SECTION OF AISLE, IN WHICH THERE IS LOGISTICS ROBOT THAT HAS ENTERED THIRD SECTION, IS GREATER THAN OR EQUAL TO FIRST PREDETERMINED VALUE

No

Yes

*S1420* — COMMAND TO STOP

*S1440* — COMMAND TO STOP

*S1450* — COMMAND TO MOVE

LOGISTICS ROBOT FLEET MANAGEMENT APPARATUS AND FLEET MANAGEMENT METHOD THEREFOR

CROSS-REFERENCE TO RELATED APPLICATION

The present application claims the benefit under 35 USC § 119(a) of Patent Application No. 10-2022-0136340, filed on Oct. 21, 2022 in Korea, the entire disclosure of which is incorporated herein by reference for all purposes.

1. FIELD

The present disclosure relates to a method and apparatus for managing a logistics robot fleet.

2. DESCRIPTION OF THE RELATED ART

The statements in the present section merely provide background information related to the present disclosure and may not constitute prior art.

Logistics automation is built to improve the efficiency of logistics transportation using logistics software and automation machinery, mainly in the production process stage.

Logistics robots that can flexibly adapt to changes in a production line and automate logistics transportation are mainly used to build the logistics automation.

Meanwhile, the production line is composed of a plurality of workstations and a plurality of aisles.

A plurality of docking devices can be installed on a workstation to move a plurality of logistics robots to docking areas where the logistics robots load and/or unload logistics. For example, when a logistics robot is required to enter a docking area, the docking device detects the logistics robot that is waiting at a docking position and moves it to the docking area. On the other hand, when the logistics robot is required to exit from the docking area, the docking device moves the logistics robot from the docking area to the docking position.

The aisle is configured to allow the plurality of logistics robots to transport logistics between a warehouse and a plurality of workstations. Moreover, the aisle can be divided into a single-sided docking aisle and a double-sided docking aisle according to a structure in which the workstations with the plurality of docking devices are arranged in the aisle. For example, in the case of the double-sided docking aisle, two workstations are arranged on both sides of the aisle.

Furthermore, the aisle can be divided into a plurality of docking lanes in which the docking positions are located and a plurality of driving lanes through which the logistics robots are driving. For example, a four-lane aisle may have two docking lanes and two driving lanes.

However, if the aisle is divided into a plurality of docking lanes and a plurality of driving lanes, there is a disadvantage in that the area of the aisle arranged in the production line increases, resulting in higher investment costs for production equipment.

To overcome this disadvantage, a narrow aisle divided into a plurality of lanes that allow docking and driving, for example, a two-lane aisle, may be arranged in the production line.

However, conventional logistics robot fleet management apparatuses have a disadvantage in that, when at least a part of the plurality of logistics robots are waiting at docking positions in a narrow aisle, the waiting time of the plurality of logistics robots increases, resulting in reduced productivity.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a processor-implemented method includes classifying a plurality of aisles into a single-sided docking aisle and a double-sided docking aisle within a structure including a plurality of workstations are arranged in the aisle, the plurality of workstations including a plurality of docking devices, dividing the single-sided docking aisle and the double-sided docking aisle into a plurality of sections, respectively, and setting a portion of the plurality of sections comprising the single-sided docking aisle and the double-sided docking aisle as a traffic section, receiving the positions of the logistics robots and the states of the logistics robots from the plurality of logistics robots, determining positions of each of a plurality of logistics robots within each section of each aisle based on received respective positions of respective logistics robots and received respective states of the respective logistics robots, counting a first number of moving logistics robots in each section of each aisle and a second number of waiting logistics robots in each section of each aisle, performing a first traffic control with respect to a first one or more logistics robots that have entered the traffic section based on the first number and the second number, performing a second traffic control with respect to a second one or more logistics robots that have requested a docking-out from the docking devices based on the first number, and generating and assigning a mission corresponding to a result of the first traffic control and the second traffic control.

The counting of the first number and the second number includes counting any one of the first number and the second number based on the respective states of the logistics robots, calculating a third number of logistics robots in each section of each aisle by summing the first number and the second number, and calculating the first number by summing the first number with respect to the plurality of sections.

The counting one or more of the first number and the second number may include, if the respective state of the respective logistics robot indicates that the respective logistics robot is docking, driving while avoiding any obstacles, or driving along its path, increasing the first number, and, if the respective state of the respective logistics robot indicates that the respective logistics robot is not docking, not driving while avoiding any obstacles, and not driving along its path, increasing the second number.

The performing a first traffic control includes performing the first traffic control with respect to a second group of logistics robots that have entered a second section and performing the first traffic control with respect to a third group logistics robots that have entered a third section.

The performing the first traffic control may include, if the second section is a single-sided docking aisle and a fourth number of moving logistics robots in a first section of the aisle, in which there is a logistics robot that has entered the second section, is greater than or equal to a first predetermined value, commanding the logistics robot to stop, and, if the second section is a single-sided docking aisle, in which there is a logistics robot that has entered the second section, and the fourth number is smaller than the first predetermined value, commanding the logistics robot to move.

The method may include, if the second section is a double-sided docking aisle and a fifth number of moving logistics robots in any one of the first section, a fourth section, and a sixth section of the aisle, in which there is a logistics robot that has entered the second section, is greater than or equal to the first predetermined value, commanding the logistics robot to stop, and, if the second section is a double-sided docking aisle, in which there is a logistics robot that has entered the second section, and the fifth number is smaller than the first predetermined value, and the aisle, in which there is a logistics robot that has entered the second section, where the fifth number is smaller than the first predetermined value, commanding the logistics robot to move.

The method may include, if the second section is a double-sided docking aisle, in which there is a logistics robot that has entered the second section, where the fifth number is smaller than the first predetermined value, and where a sixth number of moving logistics robots in any one of the first section and the fourth section the aisle, in which there is a logistics robot that has entered the second section, is greater than or equal to the first predetermined value, commanding the logistics robot to stop.

The performing the first traffic control may include, where a third section includes a single-sided docking aisle, if a seventh number of moving logistics robots in any one of a fourth section and a fifth section of the aisle, in which there is a logistics robot that has entered the third section, is greater than or equal to the first predetermined value, commanding the logistics robot to stop, and, if in the aisle, in which there is a logistics robot that has entered the third section, where the seventh number is smaller than a first predetermined value, and an eight number of moving logistics robots in any one of the first section and the second section of the aisle, in which there is a logistics robot that has entered the third section, is smaller than the first predetermined value, commanding the logistics robot to move.

The method may include, if, in the aisle, in which there is a logistics robot that has entered the third section, the seventh number is smaller than the first predetermined value, and the eighth number is greater than or equal to the first predetermined value, commanding the logistics robot to stop.

The method may include, where, when the third section is a double-sided docking aisle, if a ninth number of moving logistics robots in any one of the first section, the fourth section, and the fifth section of the aisle, in which there is a logistics robot that has entered the third section, is greater than or equal to the first predetermined value, commanding the logistics robot to stop, and, if, in the aisle, in which there is a logistics robot that has entered the third section, the ninth number is smaller than the first predetermined value, and in the aisle, in which there is a logistics robot that has entered the third section, if the sixth number is smaller than the first predetermined value, commanding the logistics robot to move.

The method may include, when the third section is a double-sided docking aisle, in the aisle, in which there is a logistics robot that has entered the third section, where the ninth number is smaller than the first predetermined value, and, in the aisle, where the logistics robot has entered the third section, where the sixth number is greater than or equal to the first predetermined value, commanding the logistics robot to stop.

The performing a second traffic control may include, if the respective states of the respective logistics robots indicate that there are logistics robots that have requested the docking-out and a tenth number of moving logistics robots in the aisle to be docked out is greater than or equal to the first predetermined value, prohibiting the logistics robots from being docked out, and, if the respective states of the respective logistics robots indicate that there are logistics robots that have requested docking-out and the tenth number is smaller than the first predetermined value, allowing the logistics robots to dock out.

In a general aspect, here is provided an electronic device, including a processor configured to classify a plurality of aisles into a single-sided docking aisle and a double-sided docking aisle within a structure including a plurality of workstations arranged within the aisle, the plurality of workstations including a plurality of docking devices, divide the single-sided docking aisle and the double-sided docking aisle into a plurality of sections to set a portion of the plurality of sections as a traffic section, receive the positions of the logistics robots and the states of the logistics robots from the plurality of logistics robots, count a first number of moving logistics robots in each section of each aisle and a second number of waiting logistics robots in each section of each aisle based on received positions of the logistics robots and the states of the logistics robots, perform a first traffic control with respect to the logistics robots that have entered the traffic section based on the number of moving logistics robots in each section of each aisle and the number of waiting logistics robots in each section of each aisle, perform a second traffic control with respect to the logistics robots that have requested docking-out from the docking devices, and send one or more missions to the plurality of logistics robots based on the received positions of the logistics robots and the received states of the logistics robots, the sending of the missions includes generating a mission corresponding to a result of the first traffic control and the second traffic control and selecting a logistics robot that will perform the mission and sends the mission to the selected logistics robot.

The traffic section may be spaced apart from a docking section for docking by one or more of the plurality of logistics robots among a plurality of lanes being divided in opposite driving directions.

In a general aspect, here is provided a processor-implemented method, including determining positions of each robot of a plurality of robots within respective sections of a plurality of aisles based on received respective positions of respective robots and received respective states of the respective robots, performing a first traffic control with respect to a first group of one or more robots that have entered a traffic section based on a first number and a second number, the first number being of moving robots in the respective sections, and the second number being of waiting robots in the respective sections, performing a second traffic control with respect to a second group of one or more robots that have requested a docking-out from docking devices based on the first number, and assigning a mission corresponding to a result of the first traffic control and the second traffic control.

If a first section of the respective sections is a single-sided docking aisle, in which a robot has entered the first section, and a third number of moving logistics robots in the first section is greater than or equal to a first predetermined value, commanding the logistics robot to stop, and where, if the first section is a single-sided docking aisle in which a robot has entered the first section, and the third number is smaller than the first predetermined value, the method includes commanding the logistics robot to move.

If a second section of the respective sections is a double-sided docking aisle and a fourth number of moving robots in any one of the second section, a fourth section, and a sixth section of the aisle, in which a logistics robot has entered the second section, is greater than or equal to a second predetermined value, commanding the logistics robot to stop, and where, if the second section is a double-sided docking aisle, in which a logistics robot has entered the second section, and the fourth number is smaller than the second predetermined value, the method includes commanding the logistics robot to move.

The performing the second traffic control may include if the robots have requested the docking-out and a fifth number of moving logistics robots in the aisle to be docked-out is greater than or equal to a third predetermined value, prohibiting the logistics robots from being docked-out and if the robots have requested docking-out and the fifth number is smaller than the third predetermined value, allowing the robots to dock out.

BRIEF DESCRIPTION OF THE DRAWINGS

FIG. 2B is a table explaining the plurality of workstations and the plurality of aisles shown in FIG. 2A.

FIG. 14 is a flowchart illustrating the process of S1240 of FIG. 12 in detail.

Figure 1:
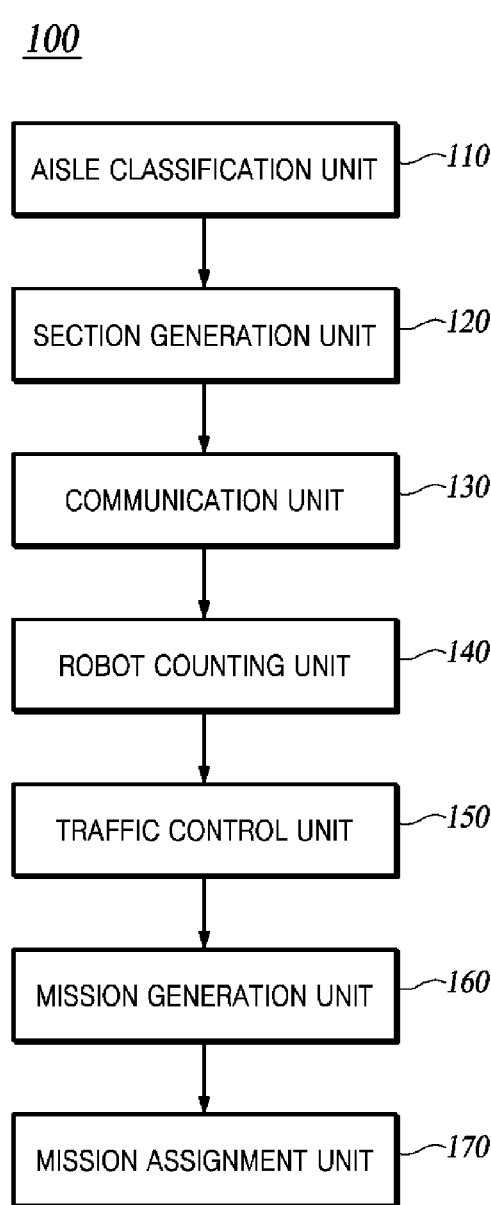
FIG. 1 is a schematic block diagram of a logistics robot fleet management apparatus according to an embodiment of the present disclosure.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment (e.g., as to what an example or embodiment may include or implement) means that at least one example or embodiment exists where such a feature is included or implemented, while all examples are not limited thereto. The use of the terms "example" or "embodiment" herein have a same meaning (e.g., the phrasing "in one example" has a same meaning as "in one embodiment", and "one or more examples" has a same meaning as "in one or more embodiments").

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

FIG. 1 is a schematic block diagram of a logistics robot fleet management apparatus according to an embodiment of the present disclosure.

Referring to FIG. 1, a logistics robot fleet management apparatus 100 according to an embodiment of the present disclosure may include all or part of an aisle classification unit 110, a section generation unit 120, a communication unit 130, a robot counting unit 140, a traffic control unit 150, a mission generation unit 160, and a mission assignment unit 170.

The aisle classification unit 110 classifies a plurality of aisles into a single-sided docking aisle and a double-sided docking aisle according to a structure in which the workstations with the plurality of docking devices are arranged in the aisle. For example, the aisle classification unit 110 classifies an aisle, in which two workstations are arranged on both sides of the aisle, as a double-sided docking aisle.

The section generation unit 120 divides the single-sided docking aisle and the double-sided docking aisle into a plurality of sections, respectively, and sets at least a part of the plurality of sections as a traffic section.

The communication unit 130 receives the positions of the logistics robots and the states of the logistics robots from a plurality of logistics robots and sends missions to the plurality of logistics robots.

The robot counting unit 140 detects the positions of the logistics robots in each section of each aisle based on the positions of the logistics robots and the states of the logistics robots and counts the number of moving logistics robots in each section of each aisle and the number of waiting logistics robots in each section of each aisle.

The traffic control unit 150 performs a first traffic control with respect to each of the logistics robots that have entered the traffic section based on the number of moving logistics robots in each section of each aisle and the number of waiting logistics robots in each section of each aisle and performs a second traffic control with respect to the logistics robots that have requested docking-out from the docking devices.

The mission generation unit 160 generates a mission corresponding to the result of the first traffic control and the second traffic control.

The mission assignment unit 170 selects a logistics robot that will perform the mission and sends the mission to the selected logistics robot via the communication unit 130.

Figure 2A:
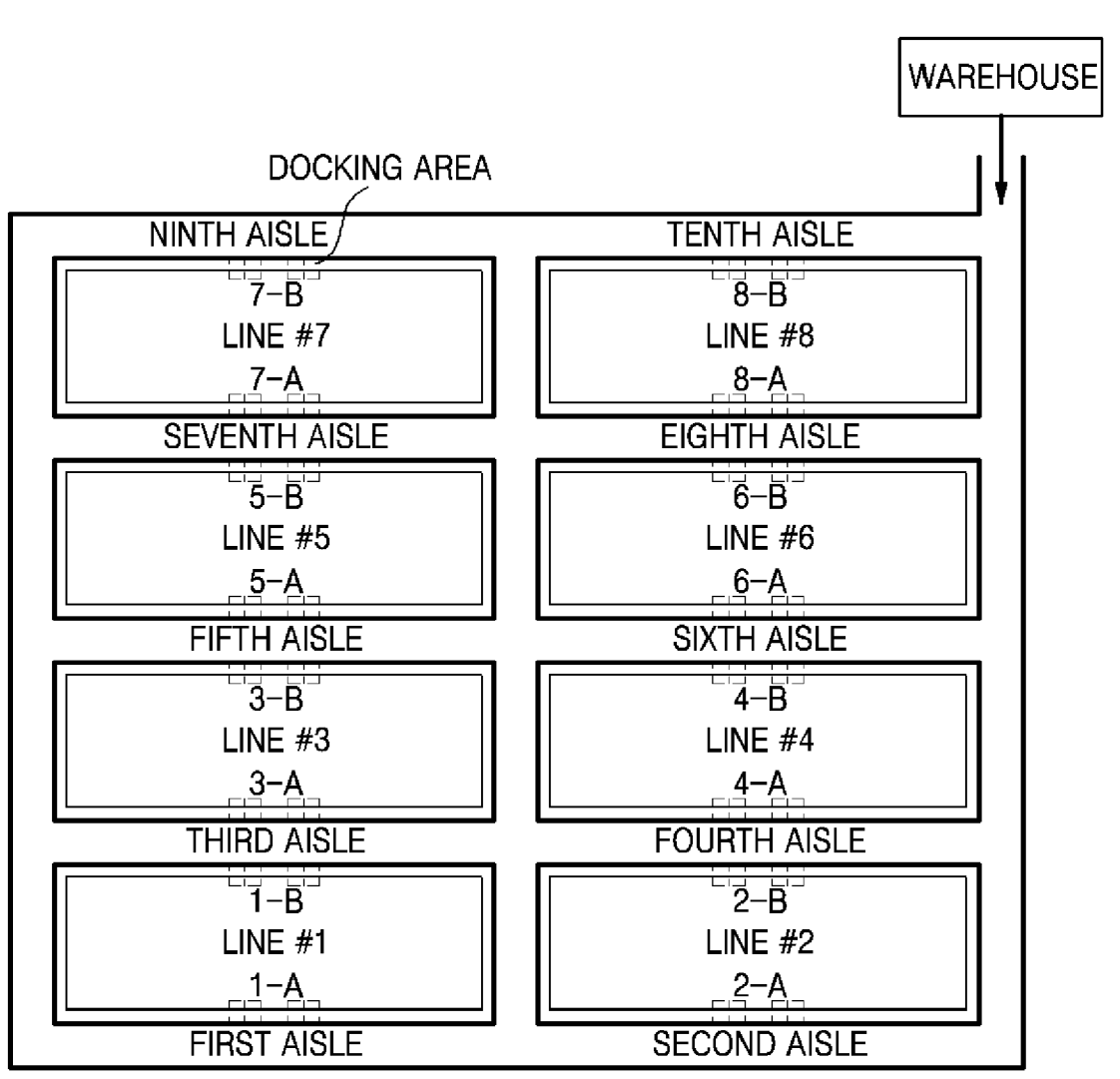
FIG. 2A is a diagram illustrating a plurality of workstations and a plurality of aisles arranged in a production line according to an embodiment of the present disclosure.

FIG. 2A is a diagram illustrating a plurality of workstations and a plurality of aisles arranged in a production line according to an embodiment of the present disclosure.

FIG. 2B is a table explaining the plurality of workstations and the plurality of aisles shown in FIG. 2A.

Referring to FIG. 2A, a production line may include all or part of a plurality of logistics robots (not shown), a plurality of lines, and a plurality of aisles.

Autonomous mobile robots (AMRs) that can flexibly adapt to changes in a production line and automate logistics transportation to establish logistics automation can be used as the plurality of logistics robots. In particular, the autonomous mobile robots can avoid any obstacles when driving through a narrow aisle.

The plurality of lines may include all or part of a plurality of workstations. Each workstation (1-A, 1-B, 2-A, 2-B, 3-A, 3-B, 4-A, 4-B, 5-A, 5-B, 6-A, 6-B, 7-A, 7-B, 8-A, and 8-B) may include all or part of a plurality of docking areas and a plurality of docking devices (not shown). In the plurality of docking areas, the plurality of logistics robots may load and unload logistics. The plurality of docking devices may be configured to move the plurality of logistics robots from the aisle to the docking area or from the docking area to the aisle.

The aisle is configured such that the plurality of logistics robots can transport logistics between a warehouse and a plurality of workstations.

Referring to FIG. 2B, the aisle may be divided into a single-sided docking aisle and a double-sided docking aisle according to a structure in which the workstations with the plurality of docking devices are arranged in the aisle. For example, the second aisle is a single-sided docking aisle since a workstation 2-A is arranged on one side of the aisle. On the other hand, the fourth aisle is a double-sided docking aisle since workstations 2-B and 4-A are arranged on both sides of the aisle.

Figure 3A:
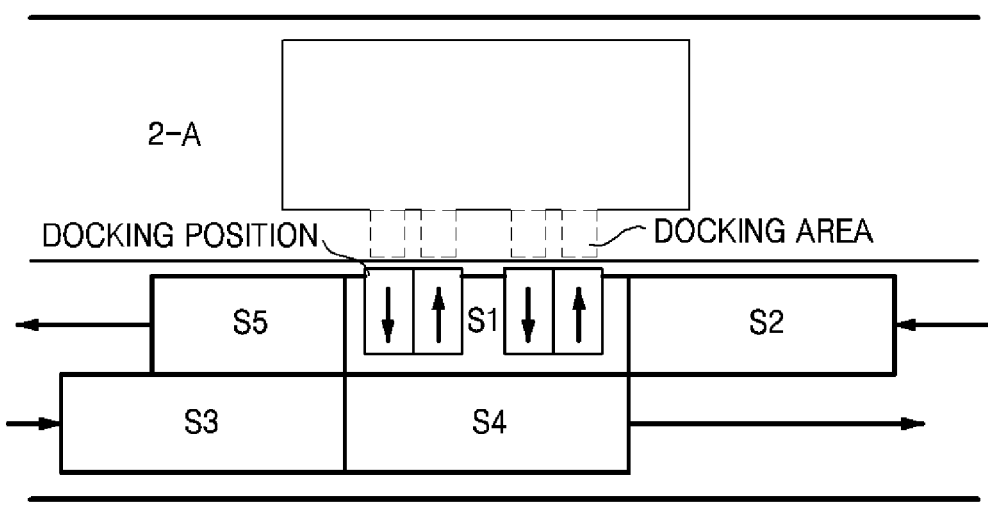
FIG. 3A is a diagram illustrating a single-sided docking section according to an embodiment of the present disclosure.

FIG. 3A is a diagram illustrating a single-sided docking section according to an embodiment of the present disclosure.

Figure 3B:
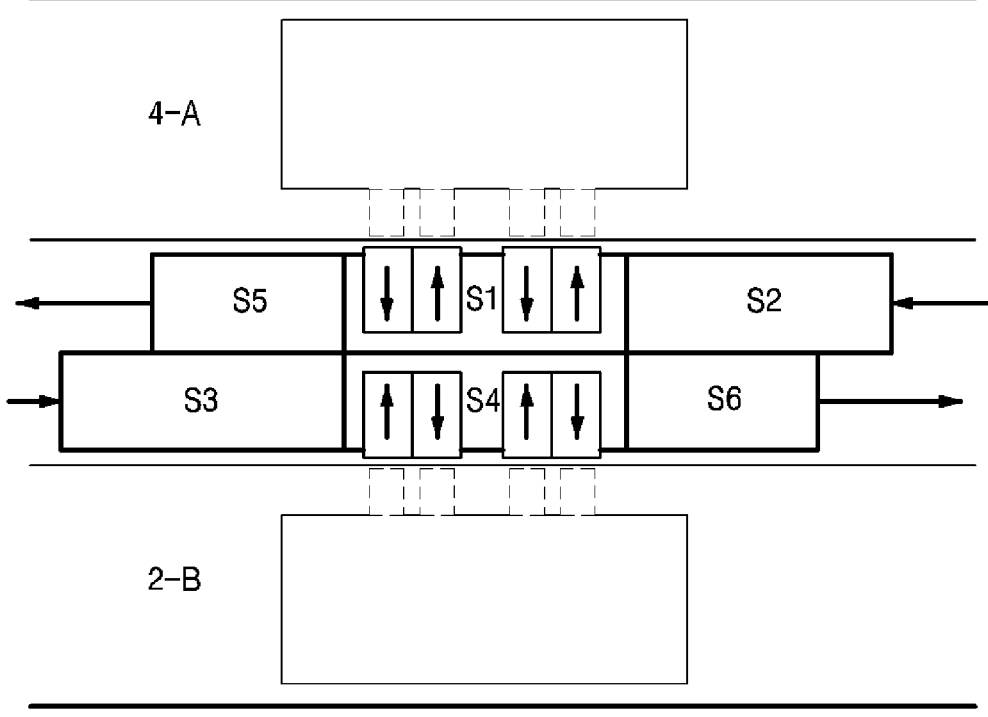
FIG. 3B is a diagram illustrating a double-sided docking section according to an embodiment of the present disclosure.

FIG. 3B is a diagram illustrating a double-sided docking section according to an embodiment of the present disclosure.

Referring to FIGS. 1 to 3A, for example, the second aisle, which is a single-sided docking aisle, may be divided into a first section 51, a second section S2, a third section S3, a fourth section S4, and a fifth section S5.

The first section is a docking section which has a plurality of docking positions where at least a part of the plurality of logistics robots wait for docking.

The second section and the third section are traffic control sections. For example, if there is a logistics robot that has entered the second section, the logistics robot fleet management apparatus 100 may determine the state of the logistics robot in the first section and command the logistics robot that has entered the second section to move or stop.

The fourth section and the fifth section are sections through which the logistics robot that has entered the second section passes to drive while avoiding the logistics robot in the first section. For example, if there is a logistics robot that is waiting for docking in the first section, the logistics robot that has entered the second section may pass through the fourth section and the fifth section to avoid the logistics robot in the first section.

Referring to FIGS. 1 to 3B, for example, the fourth aisle, which is a double-sided docking aisle, may be divided into a first section 51, a second section S2, a third section S3, a fourth section S4, a fifth section S5, and a sixth section S6.

The first section and the fourth section are docking sections which have a plurality of docking positions where at least a part of the plurality of logistics robots wait for docking.

The second section and the third section are traffic control sections. For example, if there is a logistics robot that has entered the second section, the logistics robot fleet management apparatus 100 may determine the state of the logistics robot in the first section and command the logistics robot that has entered the second section to move or stop.

The first section and the sixth section are sections through which the logistics robot that has entered the third section avoids the logistics robot in the fourth section. For example, if there is a logistics robot that is waiting for docking in the fourth section, the logistics robot that has entered the third section may pass through the first section and the sixth section to drive while avoiding the logistics robot in the fourth section.

The fourth section and the fifth section are sections through which the logistics robot that has entered the second section avoids the logistics robot in the first section. For example, if there is a logistics robot that is waiting for docking in the first section, the logistics robot that has entered the second section may pass through the fourth section and the fifth section to drive while avoiding the logistics robot in the first section.

Figure 4:
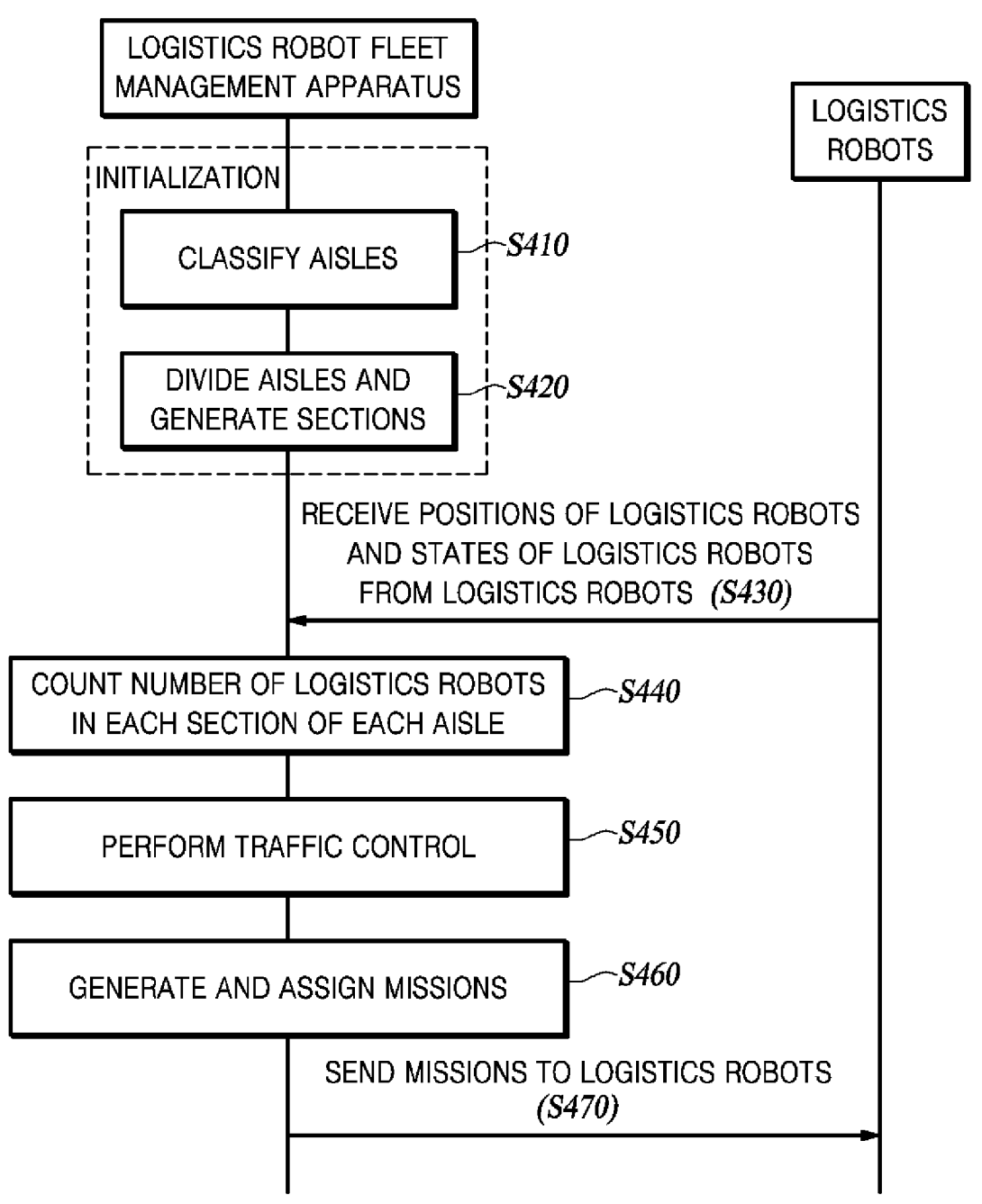
FIG. 4 is a flowchart illustrating a process in which a logistics robot fleet management apparatus according to an embodiment of the present disclosure performs a traffic control.

FIG. 4 is a flowchart illustrating a process in which a logistics robot fleet management apparatus according to an embodiment of the present disclosure performs a traffic control.

Referring to FIGS. 1 to 4, during initialization of the logistics robot fleet management apparatus 100, the aisle classification unit 110 classifies a plurality of aisles into a single-sided docking aisle and a double-sided docking aisle according to a structure in which the workstations with the plurality of docking devices are arranged in the aisle (S410). For example, the aisle classification unit 110 may classify the aisles using predetermined values for the plurality of aisles.

During the initialization of the logistics robot fleet management apparatus, the section generation unit 120 divides the single-sided docking aisle and the double-sided docking aisle into a plurality of sections, respectively, and sets at least a part of the plurality of sections as a traffic section (S420).

The communication unit 130 receives the positions of the logistics robots and the states of the logistics robots from a plurality of logistics robots (S430).

The robot counting unit 140 detects the positions of the logistics robots in each section of each aisle based on the positions of the logistics robots and counts the number of moving logistics robots in each section of each aisle and the number of waiting logistics robots in each section of each aisle based on the positions of the logistics robots and the states of the logistics robots (S440).

The traffic control unit 150 performs a first traffic control with respect to each of the logistics robots that have entered the traffic section based on the number of moving logistics robots in each section of each aisle and the number of waiting logistics robots in each section of each aisle and performs a second traffic control with respect to the logistics robots that have requested docking-out from the docking devices (S450).

The mission generation unit 160 generates a mission corresponding to the result of the first traffic control and the second traffic control (S460).

The mission assignment unit 170 selects a logistics robot that will perform the mission and sends the mission to the selected logistics robot via the communication unit 130 (S470).

Figure 5:
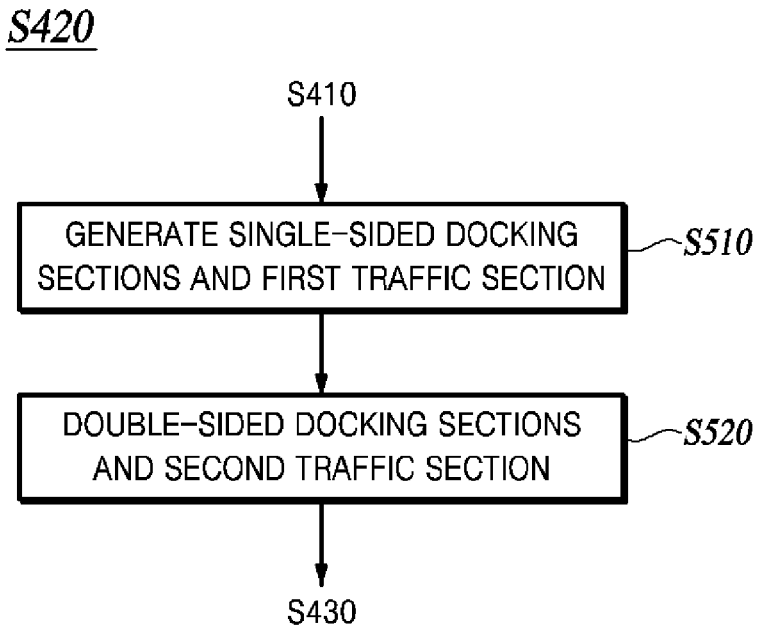
FIG. 5 is a flowchart illustrating the process of S420 of FIG. 4 in detail.

FIG. 5 is a flowchart illustrating the process of S420 of FIG. 4 in detail.

Referring to FIGS. 1 to 5, the section generation unit 120 divides the single-sided docking aisle into a plurality of single-sided docking sections and sets at least a part of the plurality of single-sided docking sections as a first traffic section (S510).

The section generation unit 120 divides the double-sided docking aisle into a plurality of double-sided docking sections and sets at least a part of the plurality of double-sided docking sections as a second traffic section (S520).

Figure 6:
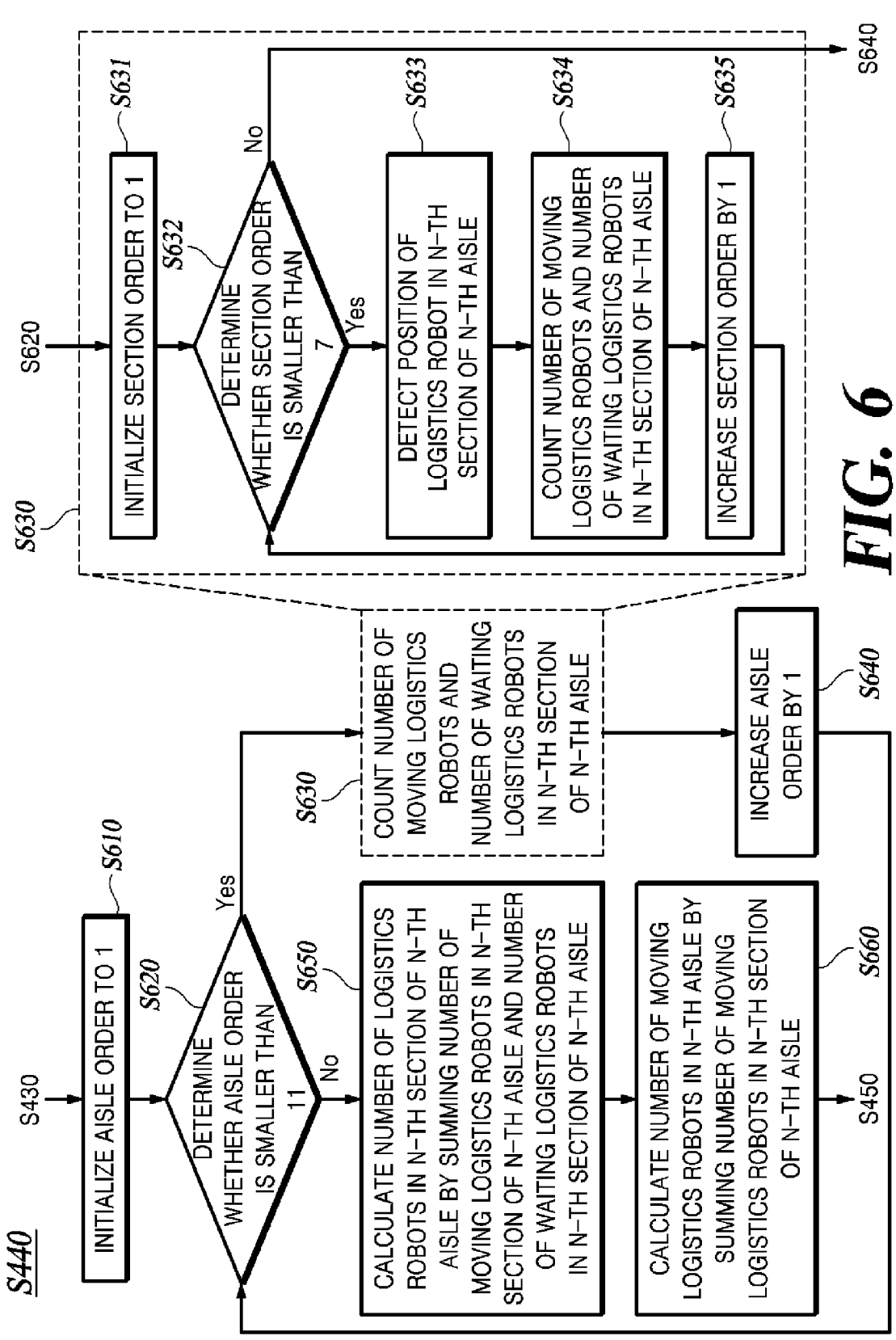
FIG. 6 is a flowchart illustrating the process of S440 of FIG. 4 in detail.

FIG. 6 is a flowchart illustrating the process of S440 of FIG. 4 in detail.

Referring to FIGS. 1 to 6, for example, ten aisles may be arranged in a production line, and each aisle may be defined as being divided into six sections.

Since the robot counting unit 140 repeats the process of S630 from the first aisle, it initializes the aisle order to 1 (S610).

Since the robot counting unit 140 repeats the process of S630 up to the tenth aisle, it determines whether the aisle order is smaller than 11 (S620).

If it is determined in the process of S620 that the aisle order is smaller than 11, the robot counting unit 140 counts the number of moving logistics robots in the n-th section of the n-th aisle (where n is a natural number) and the number of waiting logistics robots in the n-th section of the n-th aisle (S630).

Since the robot counting unit 140 repeats the process of S630 from the first section of the n-th aisle, it initializes the section order to 1 (S631).

Since the robot counting unit 140 repeats the process of S633 and the process of S634 up to the sixth section of the n-th aisle, it determines whether the section order is smaller than 7 (S632).

If it is determined in the process of S632 that the section order is smaller than 7, the robot counting unit 140 detects the position of the logistics robot in the n-th section of the n-th aisle based on the position of the logistics robot (S633).

The robot counting unit 140 counts the number of moving logistics robots in the n-th section of the n-th aisle and the number of waiting logistics robots in the n-th section of the n-th aisle based on the states of the logistics robots (S634).

Since the robot counting unit 140 repeats the process S633 and the process of S634 from the first section of the n-th aisle to the sixth section of the n-th aisle in this order, it increases the section order by 1 (S635).

If it is determined in the process of S632 that the section order is greater than or equal to 7, the robot counting unit 140 increases the aisle order by 1 (S640).

If it is determined in the process of S620 that the aisle order is greater than or equal to 11, the robot counting unit 140 calculates the number of logistics robots in the n-th section of the n-th aisle by summing the number of moving logistics robots in the n-th section of the n-th aisle and the number of waiting logistics robots in the n-th section of the n-th aisle (S650).

The robot counting unit 140 calculates the number of moving logistics robots in the n-th aisle by summing the number of moving logistics robots in the n-th section of the n-th aisle with respect to the plurality of aisles (S660).

Figure 7:
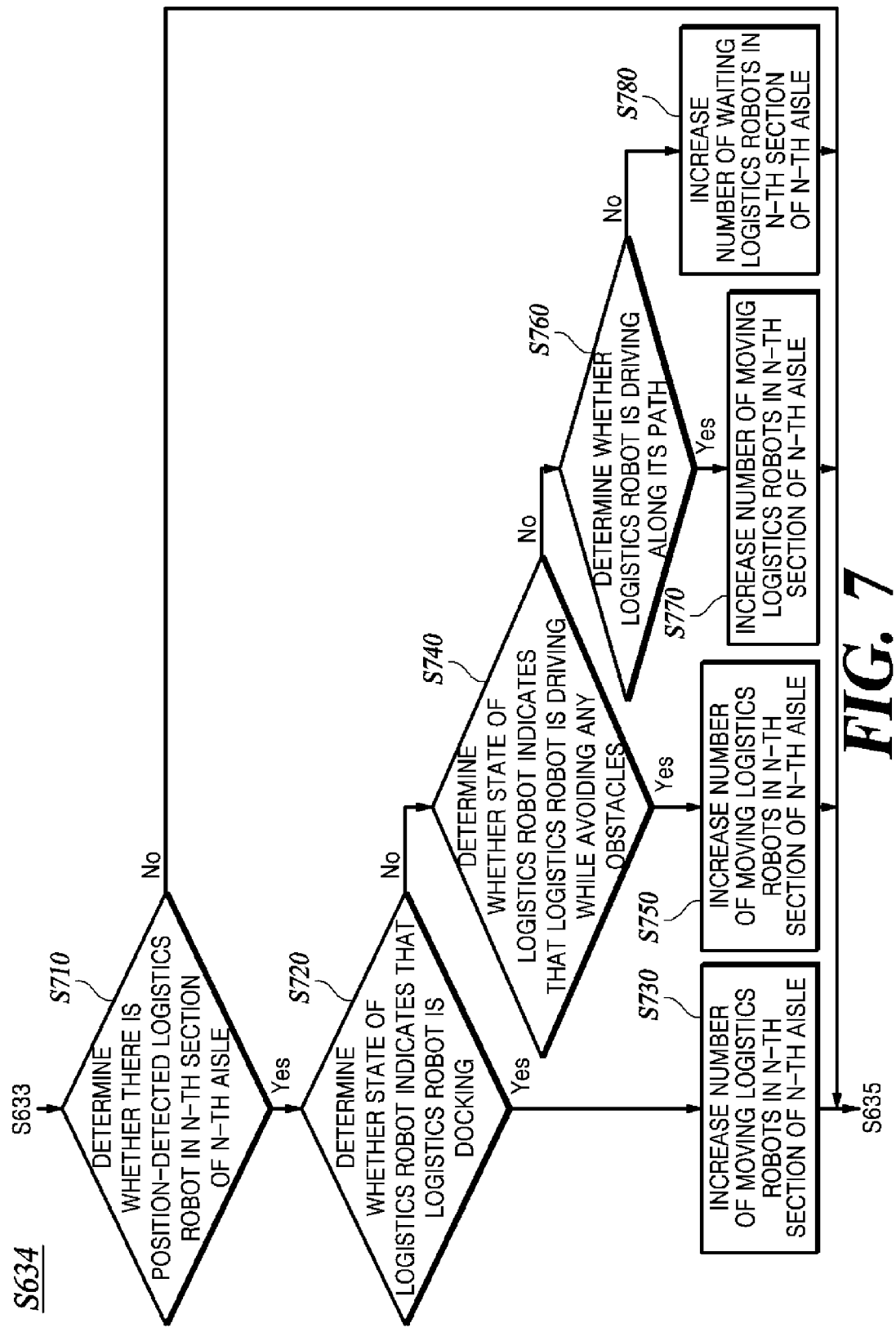
FIG. 7 is a flowchart illustrating the process of S634 of FIG. 6 in detail.

FIG. 7 is a flowchart illustrating the process of S634 of FIG. 6 in detail.

Referring to FIGS. 1 to 7, the robot counting unit 140 determines whether there is a position-detected logistics robot in the n-th section of the n-th aisle (S710).

If it is determined in the process of S710 that there is a position-detected logistics robot in the n-th section of the n-th aisle, the robot counting unit 140 determines whether the state of the logistics robot indicates that the logistics robot is docking (S720).

If it is determined in the process of S720 that the state of the logistics robot indicates that the logistics robot is docking, the robot counting unit 140 increases the number of moving logistics robots in the n-th section of the n-th aisle (S730).

If it is determined in the process of S720 that the state of the logistics robot indicates that the logistics robot is not docking, the robot counting unit 140 determines whether the state of the logistics robot indicates that the logistics robot is driving while avoiding any obstacles (S740).

If it is determined in the process of S740 that the state of the logistics robot indicates that the logistics robot is driving while avoiding any obstacles, the robot counting unit 140 increases the number of moving logistics robots in the n-th section of the n-th aisle (S750).

If it is determined in the process of S740 that the state of the logistics robot indicates that the logistics robot is not driving while avoiding any obstacles, the robot counting unit 140 determines whether the state of the logistics robot indicates that the logistics robot is driving along its path (S760).

If it is determined in the process of S760 that the state of the logistics robot indicates that the logistics robot is driving along its path, the robot counting unit 140 increases the number of moving logistics robots in the n-th section of the n-th aisle (S770).

If it is determined in the process of S760 that the state of the logistics robot indicates that the logistics robot is not driving along its path, the robot counting unit 140 increases the number of waiting logistics robots in the n-th section of the n-th aisle (S780).

Figure 8:
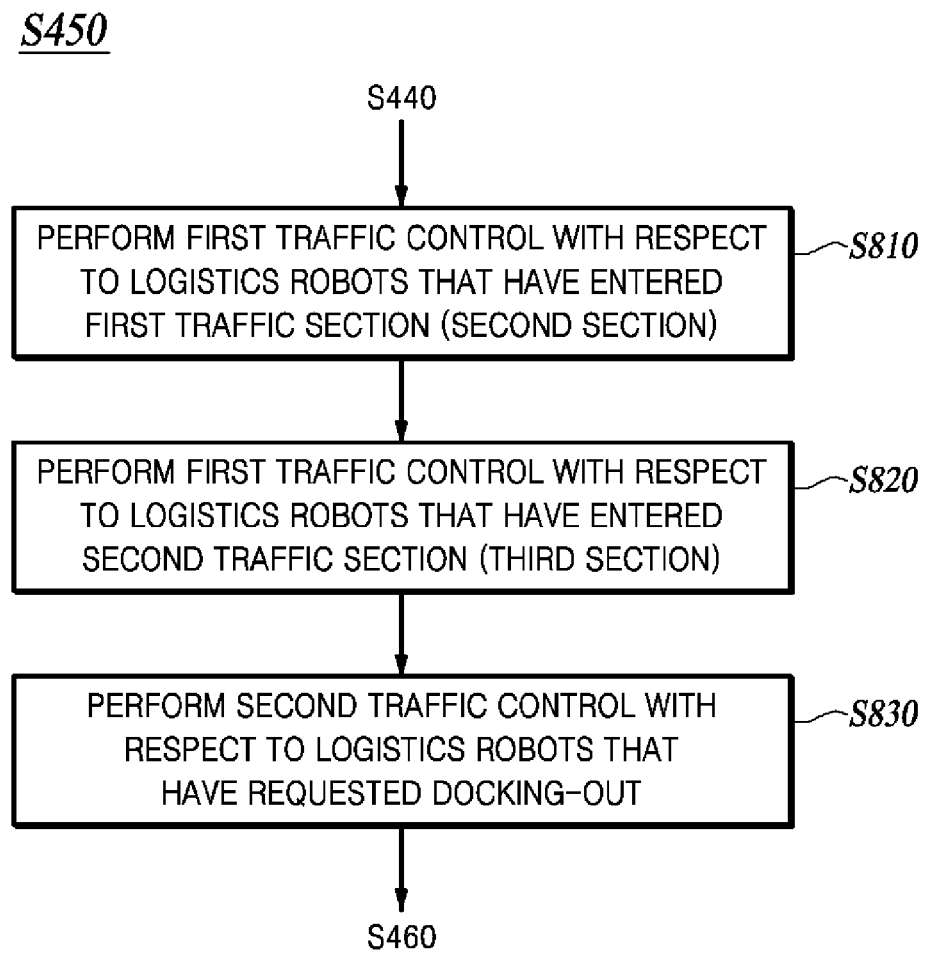
FIG. 8 is a flowchart illustrating the process of S450 of FIG. 4 in detail.

FIG. 8 is a flowchart illustrating the process of S450 of FIG. 4 in detail.

Referring to FIGS. 1 to 8, the traffic control unit 150 performs a first traffic control with respect to the logistics robots that have entered the first traffic section (second section) (S810).

The traffic control unit 150 performs the first traffic control with respect to the logistics robots that have entered the second traffic section (third section) (S820).

The traffic control unit 150 performs the second traffic control with respect to the logistics robots that have requested docking-out (S830).

Figure 9:
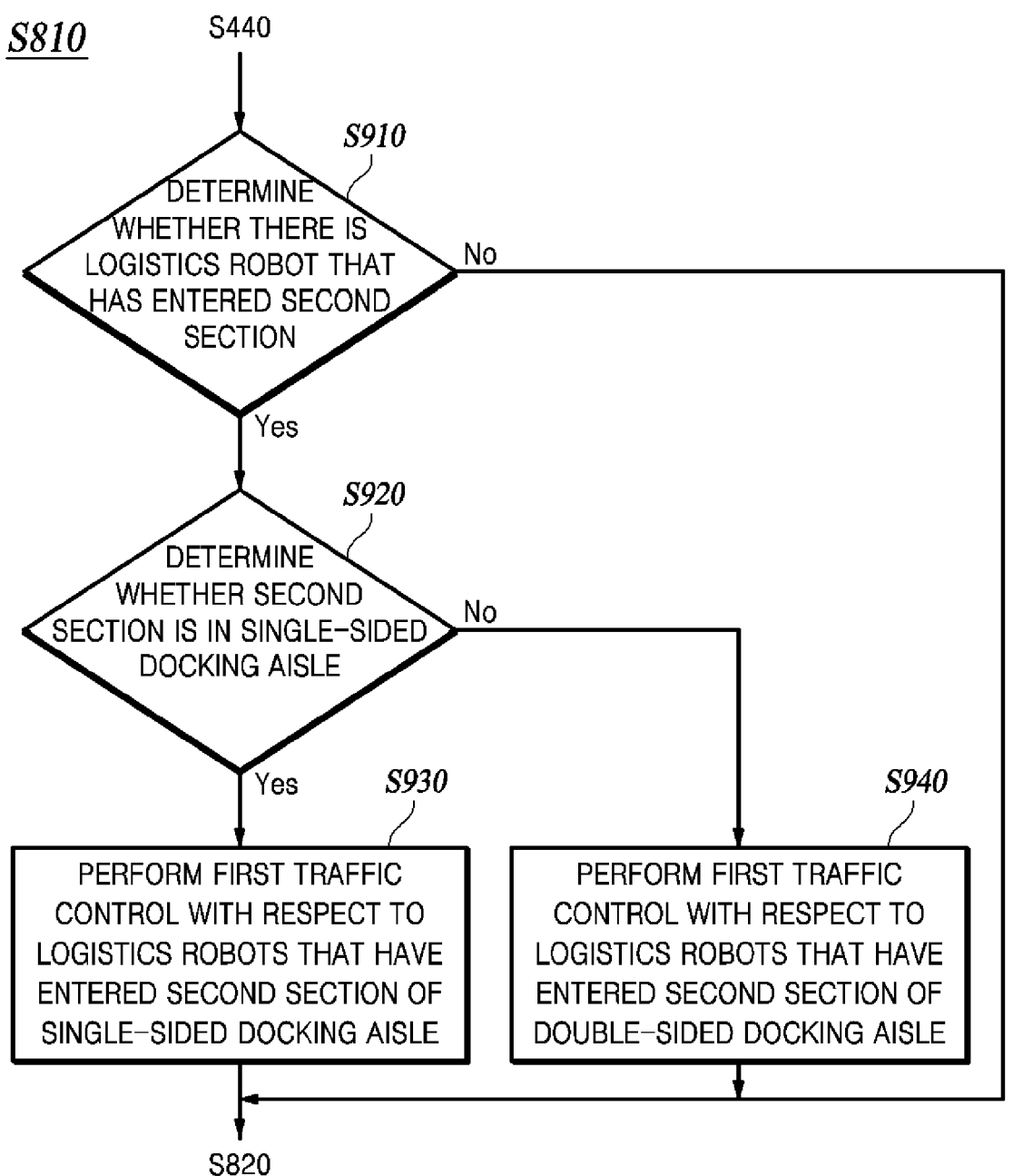
FIG. 9 is a flowchart illustrating the process of S810 of FIG. 8 in detail.

FIG. 9 is a flowchart illustrating the process of S810 of FIG. 8 in detail.

Referring to FIGS. 1 to 9, the traffic control unit 150 determines whether there is a logistics robot that has entered the second section (S910).

If it is determined in the process of S910 that there is a logistics robot that has entered the second section, the traffic control unit 150 determines whether the second section is in the single-sided docking aisle (S920).

If it is determined in the process of S920 that the second section is in the single-sided docking aisle, the traffic control unit 150 performs the first traffic control with respect to the logistics robots that have entered the second section of the single-sided docking aisle (S930).

If it is determined in the process of S920 that the second section is in the double-sided docking aisle, the traffic control unit 150 performs the first traffic control with respect to the logistics robots that have entered the second section of the double-sided docking aisle (S940).

Figure 10:
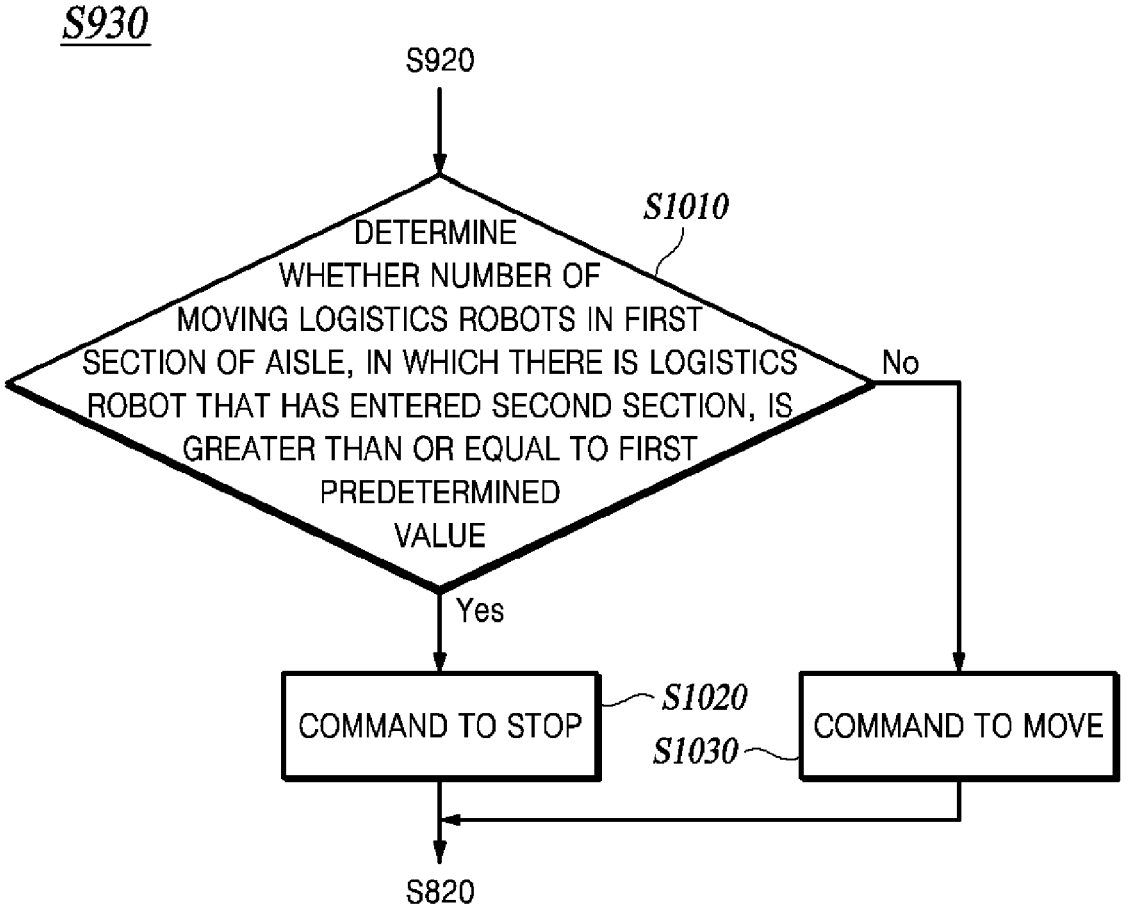
FIG. 10 is a flowchart illustrating the process of S930 of FIG. 9 in detail.

FIG. 10 is a flowchart illustrating the process of S930 of FIG. 9 in detail.

Referring to FIGS. 1 to 10, the traffic control unit 150 determines whether the number of moving logistics robots in the first section of the aisle, in which there is a logistics robot that has entered the second section, is greater than or equal to a first predetermined value (S1010).

If it is determined in the process of S1010 that the number of moving logistics robots in the first section of the aisle, in which there is a logistics robot that has entered the second section, is greater than or equal to the first predetermined value, the traffic control unit 150 commands the logistics robot that has entered the second section to stop (S1020).

If it is determined in the process of S1010 that the number of moving logistics robots in the first section of the aisle, in which there is a logistics robot that has entered the second section, is smaller than the first predetermined value, the traffic control unit 150 commands the logistics robot that has entered the second section to move (S1030). For example, if there is a logistics robot that is waiting for docking in the first section, the logistics robot that has entered the second section drives while avoiding the logistics robot in the first section.

Figure 11:
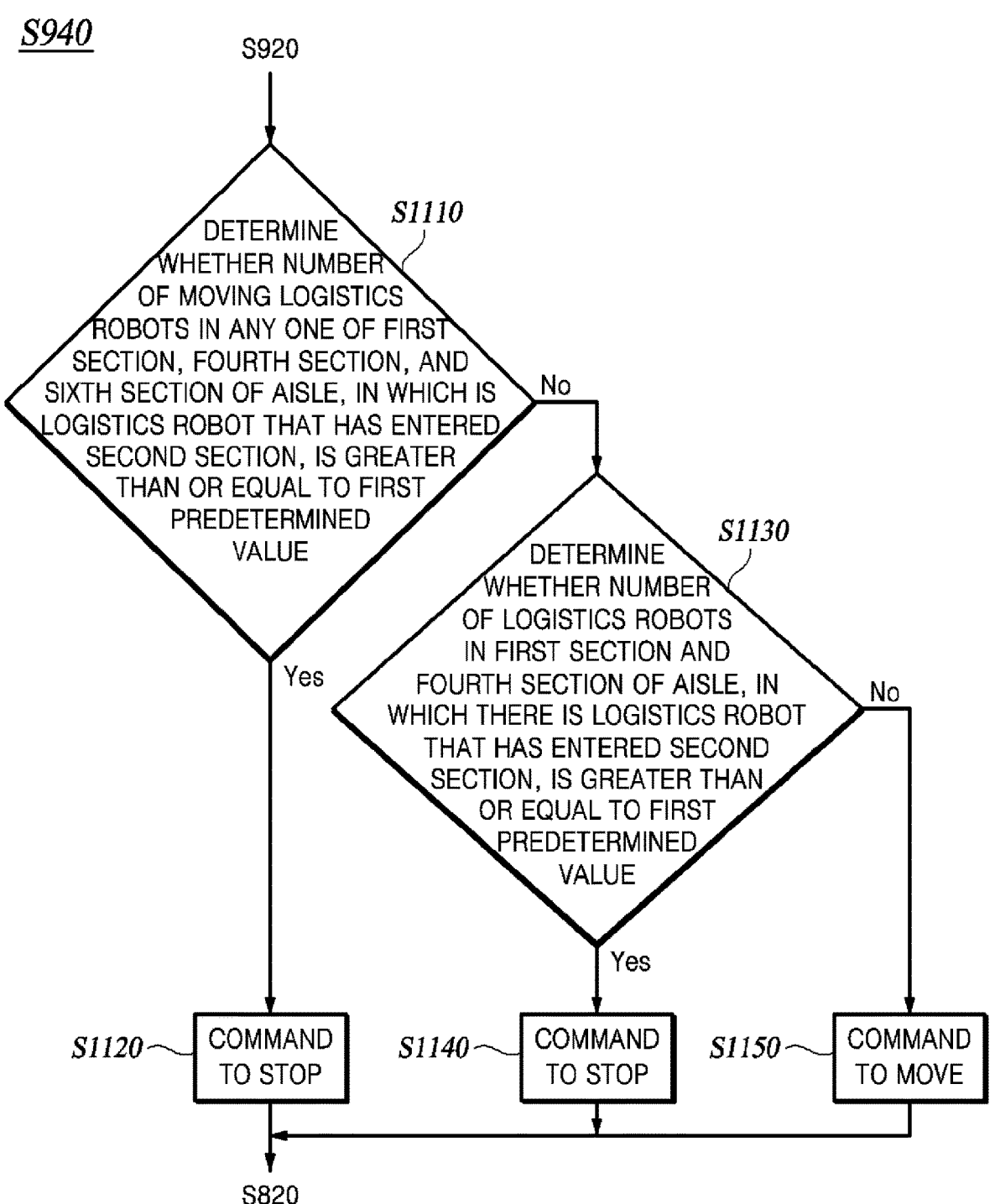
FIG. 11 is a flowchart illustrating the process of S940 of FIG. 9 in detail.

FIG. 11 is a flowchart illustrating the process of S940 of FIG. 9 in detail.

Referring to FIGS. 1 to 11, the traffic control unit 150 determines whether the number of moving logistics robots in any one of the first section, the fourth section, and the sixth section of the aisle, in which there is a logistics robot that has entered the second section, is greater than or equal to the first predetermined value (S1110).

If it is determined in the process of S1110 that the number of moving logistics robots in any one of the first section, the fourth section, and the sixth section of the aisle, in which there is a logistics robot that has entered the second section, is greater than or equal to the first predetermined value, the traffic control unit 150 commands the logistics robot to stop (S1120).

If it is determined in the process of S1120 that the number of moving logistics robots in the first section, the fourth section, and the sixth section of the aisle, in which there is a logistics robot that has entered the second section, is smaller than the first predetermined value, the traffic control unit 150 determines whether the number of logistics robots in the first section and the fourth section of the aisle, in which there is a logistics robot that has entered the second section, is greater than or equal to the first predetermined value (S1130).

If it is determined in the process of S1130 that the number of logistics robots in the first section and the fourth section of the aisle, in which there is a logistics robot that has entered the second section, is greater than or equal to the first predetermined value, the traffic control unit 150 commands the logistics robot that has entered the second section to stop (S1140). For example, if there is a logistics robot that is waiting for docking in each of the first section and the fourth section, the logistics robot that has entered the second section stops in the second section.

If it is determined in the process of S1130 that the number of logistics robots in any one of the first section and the fourth section of the aisle, in which there is a logistics robot that has entered the second section, is smaller than the first predetermined value, the traffic control unit 150 commands the logistics robot that has entered the second section to move (S1150). For example, if there is a logistics robot that is waiting for docking in any one of the first section and the fourth section, the logistics robot that has entered the second section drives while avoiding the logistics robots that are waiting for docking in any one of the first section and the fourth section.

Figure 12:
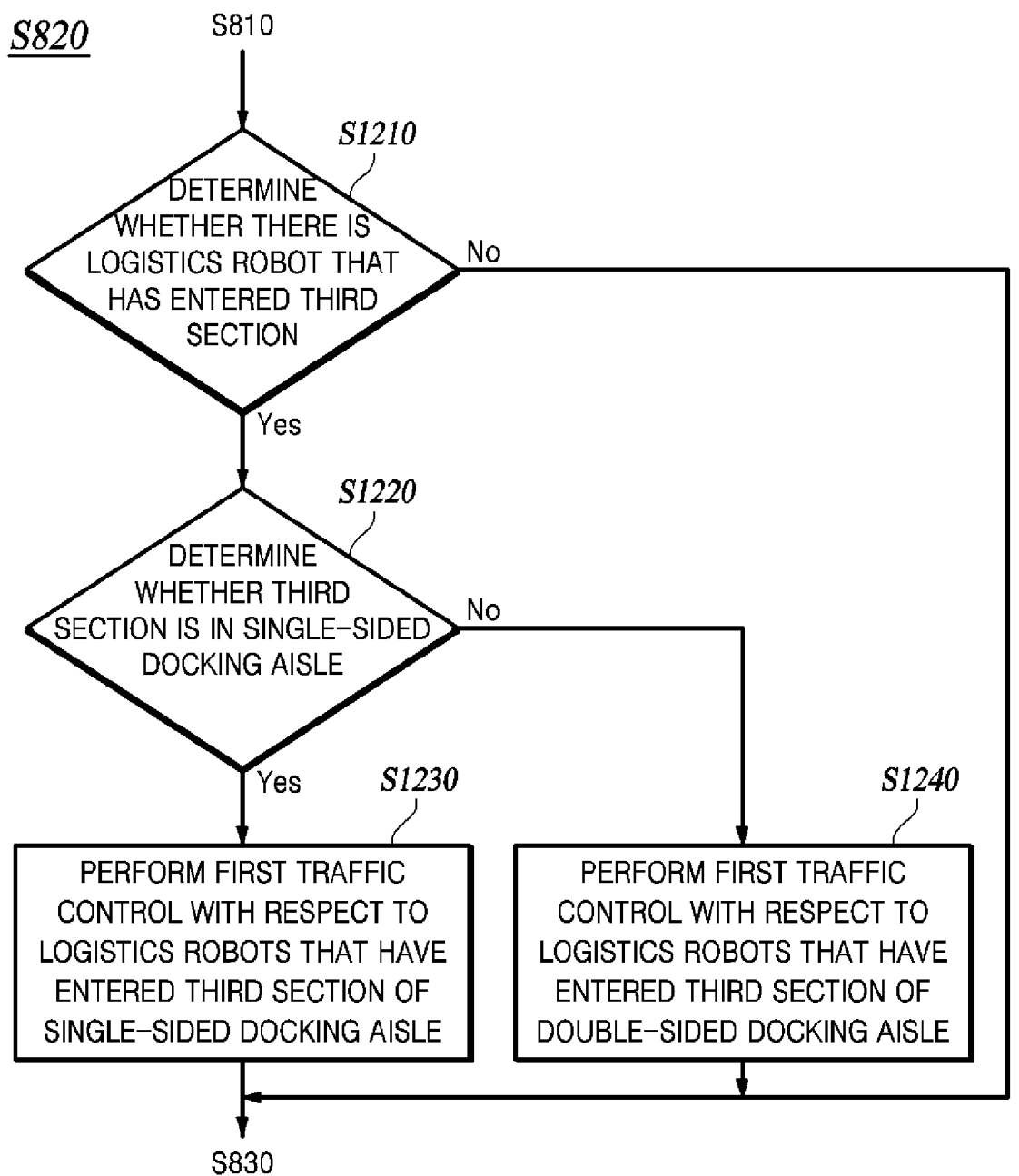
FIG. 12 is a flowchart illustrating the process of S820 of FIG. 8 in detail.

FIG. 12 is a flowchart illustrating the process of S820 of FIG. 8 in detail.

Referring to FIGS. 1 to 12, the traffic control unit 150 determines whether there is a logistics robot that has entered the third section (S1210).

If it is determined in the process of S1210 that there is a logistics robot that has entered the third section, the traffic control unit 150 determines whether the third section is in a single-sided docking aisle (S1220).

If it is determined in the process of S1220 that the third section is in the single-sided docking aisle, the traffic control unit 150 performs the first traffic control with respect to the logistics robots that have entered the third section of the single-sided docking aisle (S1230).

If it is determined in the process of S1220 that the third section is in a double-sided docking aisle, the traffic control unit 150 performs the first traffic control with respect to the logistics robots that have entered the third section of the double-sided docking aisle (S1240).

Figure 13:
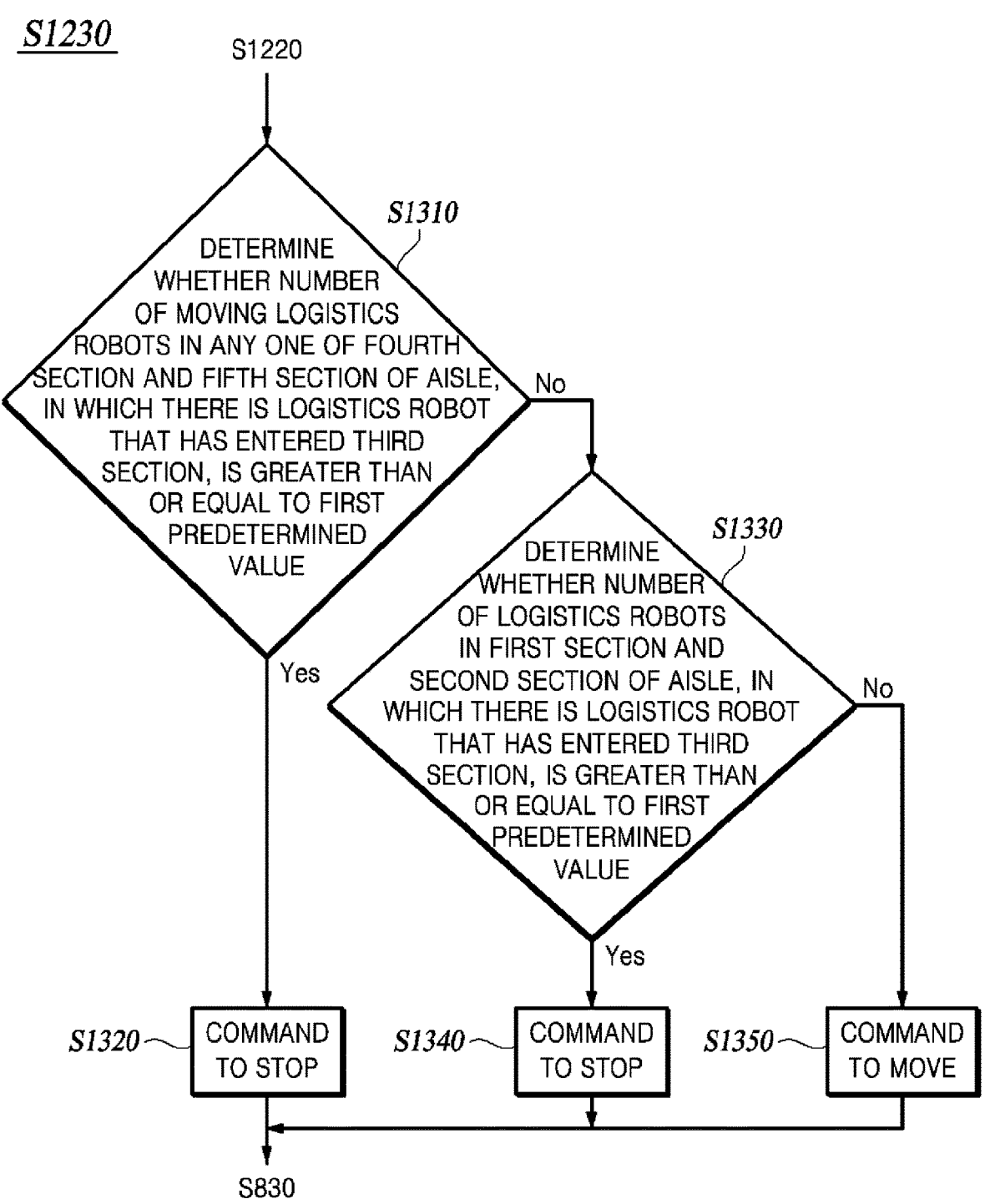
FIG. 13 is a flowchart illustrating the process of S1230 of FIG. 12 in detail.

FIG. 13 is a flowchart illustrating the process of S1230 of FIG. 12 in detail.

Referring to FIGS. 1 to 13, the traffic control unit 150 determines whether the number of moving logistics robots in any one of the fourth section and the fifth section of the aisle, in which there is a logistics robot that has entered the third section, is greater than or equal to the first predetermined value (S1310).

If it is determined in the process of S1310 that the number of moving logistics robots in any one of the fourth section and the fifth section of the aisle, in which there is a logistics robot that has entered the third section, is greater than or equal to the first predetermined value, the traffic control unit 150 commands the logistics robot that has entered the third section to stop (S1320).

If it is determined in the process of S1310 that the number of moving logistics robots in the fourth section and the fifth section of the aisle, in which there is a logistics robot that has entered the third section, is smaller than the first predetermined value, the traffic control unit 150 determines whether the number of logistics robots in the first section and the second section of the aisle, in which there is a logistics robot that has entered the third section, is greater than or equal to the first predetermined value (S1330).

If it is determined in the process of S1330 that the number of logistics robots in the first section and the second section of the aisle, in which there is a logistics robot that has entered the third section, is greater than or equal to the first predetermined value, the traffic control unit 150 commands the logistics robot that has entered the third section to stop (S1340). For example, if a logistics robot that has entered the second section can drive while avoiding the logistics robot in the first section, the logistics robot that has entered the third section stops in the third section.

If it is determined in the process of S1330 that the number of logistics robots in any one of the first section and the second section of the aisle, in which there is a logistics robot that has entered the third section, is smaller than the first predetermined value, the traffic control unit 150 command the logistics robots that have entered the third section to move (S1350).

FIG. 14 is a flowchart illustrating the process of S1240 of FIG. 12 in detail.

Referring to FIGS. 1 to 14, the traffic control unit 150 determines whether the number of moving logistics robots in any one of the first section, the fourth section, and the fifth section of the aisle, in which there is a logistics robot that has entered the third section, is greater than or equal to the first predetermined value (S1410).

If it is determined in the process of S1410 that the number of moving logistics robots in any one of the first section, the fourth section, and the fifth section of the aisle, in which there is a logistics robot that has entered the third section, is greater than or equal to the first predetermined value, the traffic control unit 150 commands the logistics robot that has entered the third section to stop (S1420).

If it is determined in the process of S1410 that the number of moving logistics robots in the first section, the fourth section, and the fifth section of the aisle, in which there is a logistics robot that has entered the third section, is smaller than the first predetermined value, the traffic control unit 150 determines whether the number of logistics robots in the first section and the fourth section of the aisle, in which there is a logistics robot that has entered the third section, is greater than or equal to the first predetermined value (S1430).

If it is determined in the process of S1430 that the number of logistics robots in the first section and the fourth section of the aisle, in which there is a logistics robot that has entered the third section, is greater than or equal to the first predetermined value, the traffic control unit 150 commands the logistics robot that has entered the third section to stop (S1440). For example, if there are logistics robots that are waiting for docking in the first section and the fourth section, the logistics robot that has entered the third section stops in the third section.

If it is determined in the process of S1430 that the number of logistics robots in any one of the first section and the fourth section of the aisle, in which there is a logistics robot that has entered the third section, is smaller than the first predetermined value, the traffic control unit 150 commands the logistics robot that has entered the third section to move (S1450). For example, if there is a logistics robot that is waiting for docking in any one of the first section and the fourth section, the logistics robot that has entered the third section drives while avoiding the logistics robots that are waiting for docking in the first section and the fourth section.

Figure 15:
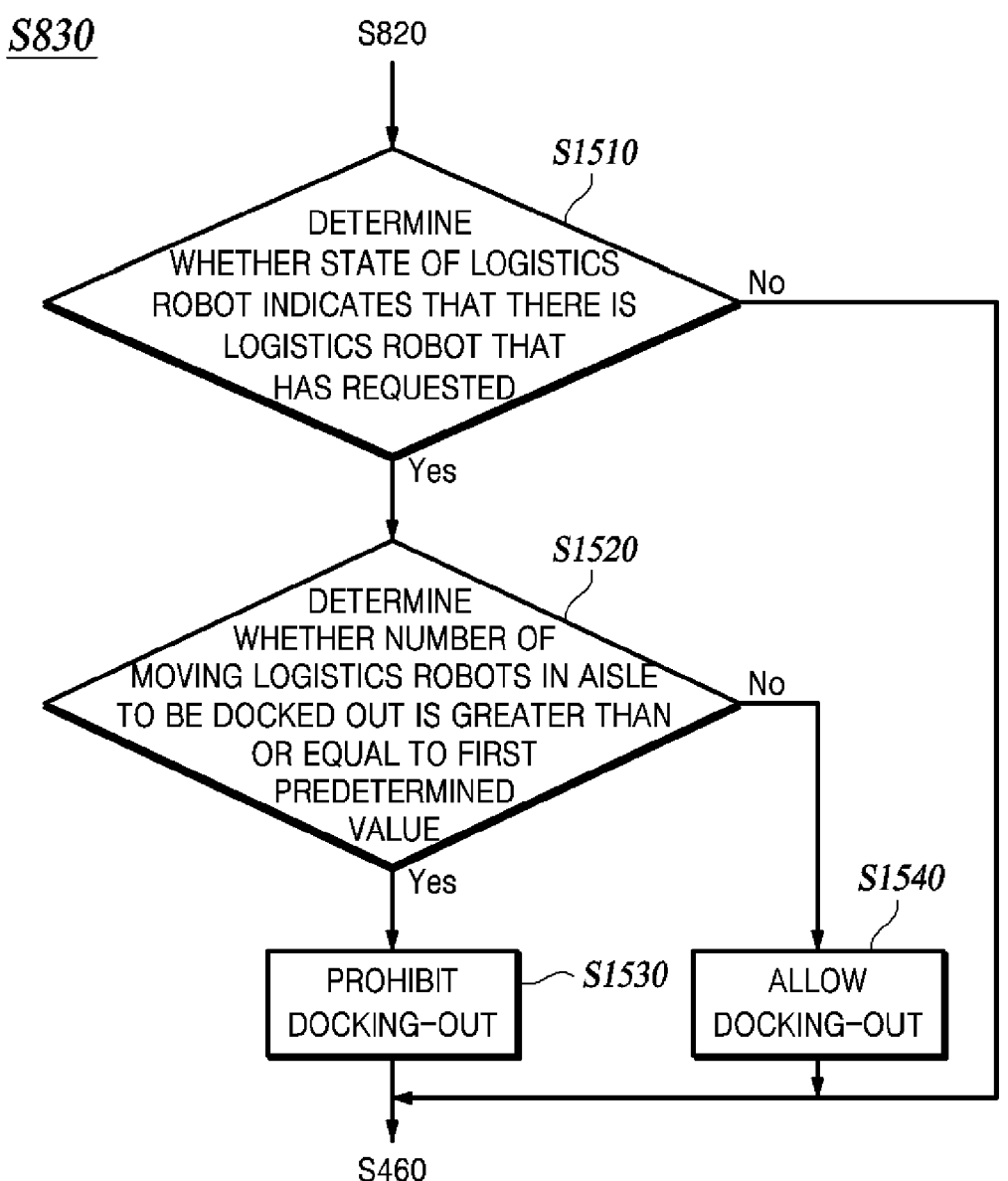
FIG. 15 is a flowchart illustrating the process of S830 of FIG. 8 in detail.

FIG. 15 is a flowchart illustrating the process of S830 of FIG. 8 in detail.

Referring to FIGS. 1 to 15, the traffic control unit 150 determines whether the state of the logistics robot indicates that there is a logistics robot that has requested docking-out for movement from the docking area to the aisle (S1510).

If it is determined in the process of S1510 that the state of the logistics robot indicates that there is a logistics robot that has requested docking-out, the traffic control unit 150 determines whether the number of moving logistics robots in the aisle to be docked out is greater than or equal to the first predetermined value (S1520).

If it is determined in the process of S1520 that the number of moving logistics robots in the aisle to be docked out is greater than or equal to the first predetermined value, the traffic control unit 150 prohibits the logistics robots that have requested docking-out from being docked out (S1530).

If it is determined in the process of S1520 that the number of moving logistics robots in the aisle to be docked out is smaller than the first predetermined value, the traffic control unit 150 allows the logistics robots that have requested docking-out to dock out (S1540).

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:

classifying a plurality of aisles of a structure, in which a plurality of workstations are arranged, into a single-sided docking aisle and a double-sided docking aisle, the plurality of workstations comprising a plurality of docking devices;

dividing the single-sided docking aisle and the double-sided docking aisle into a plurality of aisle sections and setting at least one of the aisle sections as a traffic-control section;

receiving from each of a plurality of logistics robots, a respective position $P_i$ and a respective state $S_i$;

determining, for each of the plurality of logistics robots for which $P_i$ and $S_i$ are received, a sectional position of the robot within the aisle sections based on the respective positions $P_i$ and the respective states $S_i$;

for each aisle section, counting a first number $N_{move}$ of logistics robots whose state $S_i$ indicates docking, obstacle-avoidance driving, or path-following, and a second number $N_{wait}$ of logistics robots whose state $S_i$ indicates none of docking, obstacle-avoidance driving, nor path-following;

comparing at least one of $N_{move}$ and $N_{wait}$ for one or more aisle sections to a first threshold value $T_1$;

performing traffic control by commanding a first logistics robots that has entered the traffic-control section to move or stop based on the comparison to $T_1$;

performing traffic control by commanding a second logistics robot that has requested a docking-out from the docking devices to move or stop based on $N_{move}$; and generating and assigning a mission corresponding to a result of the first traffic control and the second traffic control.

2. The method of claim 1, wherein counting comprises:

for each aisle section, computing a third number of logistics robots as a sum of $N_{move}$ and $N_{wait}$ in that section;

and computing an aisle-level moving count by summing $N_{move}$ across the aisle sections of that aisle.

3. The method of claim 1, wherein the counting is performed by a robot counting unit configured to detect the sectional position of each logistics robot based on the received positions and increment $N_{move}$ when $S_i$ indicates docking, obstacle-avoidance driving, or path-following, and increment $N_{wait}$ otherwise.

4. The method of claim 1, wherein the traffic control section comprises a second section and a third section distinct from docking sections.

5. The method of claim 4, wherein the aisle containing the second section is a single-sided docking aisle, and commanding the robot that has entered the second section comprises:

if a fourth number of moving logistics robots in a first section of that aisle is greater than or equal to $T_1$, commanding the robot to stop, and if the fourth number is less than $T_1$, commanding the robot to move.

6. The method of claim 4, wherein the aisle containing the third section is a single-sided docking aisle, and commanding the robot that has entered the third section comprises:

if a fifth number of moving logistics robots in either a fourth section or a fifth section of that aisle is greater than or equal to $T_1$, commanding the robot to stop, and if the fifth number is less than $T_1$, commanding the robot to move.

7. The method of claim 6, when the fifth number is less than $T_1$, commanding the robot that has entered the third section to stop if a sixth number of moving logistics robots in any one of the first section or the fourth section is greater than or equal to $T_1$.

8. The method of claim 4, wherein the aisle containing the second section is a double-sided docking aisle, and commanding the robot that has entered the second section comprises:

if a seventh number of moving logistics robots in any one of the first section, a fourth section or a sixth section of that aisle is greater than or equal to $T_1$, commanding the robot to stop; and if a seventh number of moving logistics robots in any one of the first section, a fourth section, or a sixth section of that aisle is less than $T_1$, commanding the robot to move.

9. The method of claim 8,
wherein when the seventh number is less than $T_1$, commanding the robot that has entered the second section to stop if an eighth number of moving logistics robots in both the first section and the fourth section is greater than or equal to $T_1$.

10. The method of claim 4,
wherein the aisle containing the third section is a double-sided docking aisle, and commanding the robot that has entered the third section comprises:
if a ninth number of moving logistics robots in any one of the first section, the fourth section, or the sixth section of that aisle is greater than or equal to $T_1$, commanding the robot to stop, and
if the ninth number is less than $T_1$, commanding the robot to move.

11. The method of claim 10, wherein, when the ninth number is less than $T_1$, commanding the robot that has entered the third section to stop if the sixth number of moving logistics robots in any one of the first section or the fourth section is greater than or equal to $T_1$.

12. The method of claim 1, wherein commanding the second logistics robot that has requested docking-out comprises:
if a tenth number of moving logistics robots in an aisle to be docked-out is greater than or equal to $T_1$, prohibiting docking-out; and if the tenth number is less than $T_1$, allowing docking-out.

13. An electronic apparatus comprising a processor and a memory storing instructions which, when executed by the processor, cause the processor to
classify a plurality of aisles of a structure, in which a plurality of workstations having docking devices are arranged, into a single-sided docking aisle and a double-sided docking aisle;
divide the single-sided docking aisle and the double-sided docking aisle into a plurality of aisle sections to set at least one of the aisle sections as a traffic-control section;
receive, from each of a plurality of logistics robots operating in the aisles, a respective position $P_i$ and a respective state $S_i$;
determine, for each of the plurality of logistics robots for which the respective position $P_i$ and the respective state $S_i$ are received, a sectional position of the logistics robot within the aisle sections based on the respective position $P_i$ and the respective state $S_i$;
for each of the aisle sections, count a first number $N_{move}$ of logistics robots whose state $S_i$ indicates docking, obstacle-avoidance driving, or path-following and a second number $N_{wait}$ of logistics robots whose state $S_i$ indicates none of docking, obstacle-avoidance driving, nor path following;
compare at least one of the first number $N_{move}$ and the second number $N_{wait}$ for one or more of the aisle sections to a first threshold value $T_1$;

perform traffic control by commanding a first logistics robot that has entered the traffic-control section to move or to stop based on a result of the comparison to the first threshold value $T_1$;
perform traffic control by commanding a second logistics robot that has requested docking-out from the docking devices to move or to stop based on the first number $N_{move}$; and
generate and assign a mission corresponding to a result of the traffic control performed for the first logistics robot and the second logistics robot,
wherein logistics robots whose state $S_i$ indicates none of docking, obstacle-avoidance driving, nor path-following are treated as contributing to the second number $N_{wait}$.

14. The apparatus of claim 13, wherein the traffic-control section is spaced apart from a docking section among lanes divided in opposite driving directions.

15. A processor-implemented method, the method comprising:
determining sectional positions for a plurality of logistics robots based on received positions and states $S_i$;
for each aisle section, counting $N_{move}$ as logistics robots whose state $S_i$ indicates docking, obstacle-avoidance driving, or path-following and counting $N_{wait}$ as logistics robots whose state indicates none of docking, obstacle-avoidance driving nor path-following;
comparing at least one of $N_{move}$ and $N_{wait}$ for one or more aisle sections to $T_1$;
commanding a first logistics robot that has entered a traffic-control section to move or stop based on the comparison to $T_1$;
commanding a second logistics robot that has requested docking-out from docking devices to move or stop based on $N_{move}$; and
generating and assigning a mission corresponding to the commanded traffic controls.

16. The method of claim 15, wherein, for a single-sided docking aisle containing a first section, when a third number of moving logistics robots in the first section is greater than or equal to $T_1$ the robot is commanded to stop, and
when the third number is less than $T_1$ the robot is commanded to move.

17. The method of claim 15, wherein, for a double-sided docking aisle containing a second section, when a fourth number of moving robots in any one of the second section, a fourth section, or a sixth section is greater than or equal to a second threshold value $T_2$, the robot is commanded to stop, and
when the fourth number is less than $T_2$ the robot is commanded to move.

18. The method of claim 15, wherein commanding the second logistics robot that has requested docking-out comprises:
if a fifth number of moving logistics robots in the aisle to be docked-out is greater than or equal to a third threshold value $T_3$, prohibiting docking-out; and
if the fifth number is smaller than the third threshold $T_3$, allowing docking-out.

* * * * *